(12) United States Patent
Kwon et al.

(10) Patent No.: US 9,755,220 B2
(45) Date of Patent: Sep. 5, 2017

(54) METHOD FOR MANUFACTURING CABLE-TYPE SECONDARY BATTERY

(71) Applicant: LG Chem Ltd., Seoul (KR)

(72) Inventors: Yo-han Kwon, Daejeon (KR); Joo Sung Lee, Daejeon (KR); Je-Young Kim, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 77 days.

(21) Appl. No.: 14/482,086

(22) Filed: Sep. 10, 2014

(65) Prior Publication Data

US 2014/0377452 A1 Dec. 25, 2014

Related U.S. Application Data

(63) Continuation of application No. 13/237,299, filed on Sep. 20, 2011, now Pat. No. 8,895,101, which is a
(Continued)

(30) Foreign Application Priority Data

Feb. 2, 2010 (KR) .................. 10-2010-0009438
Jan. 12, 2011 (KR) .................. 10-2011-0003202

(51) Int. Cl.
*H01M 4/76* (2006.01)
*C23C 18/12* (2006.01)
(Continued)

(52) U.S. Cl.
CPC ....... *H01M 4/0404* (2013.01); *C23C 18/1291* (2013.01); *H01M 4/0411* (2013.01);
(Continued)

(58) Field of Classification Search
CPC ......... H01M 10/0436; H01M 10/0565; H01M 4/622; H01M 4/667; H01M 4/668;
(Continued)

(56) References Cited

U.S. PATENT DOCUMENTS 4,354,989 A * 10/1982 Beach .................. B29C 47/02
264/171.16
4,902,589 A 2/1990 Dahn et al.
(Continued)

FOREIGN PATENT DOCUMENTS

CN 1905247 A 1/2007
JP 04-169066 A 6/1992
(Continued)

OTHER PUBLICATIONS

KR 20070009231 A Abstract translation.*

*Primary Examiner* — Dah-Wei D Yuan
*Assistant Examiner* — Jose Hernandez-Diaz
(74) *Attorney, Agent, or Firm* — Lerner, David, Littenberg, Krumholz & Mentlik, LLP

(57) ABSTRACT

The present invention relates to a method for manufacturing a cable-type secondary battery comprising an electrode that extends longitudinally in a parallel arrangement and that includes a current collector having a horizontal cross section of a predetermined shape and an active material layer formed on the current collector, and the electrode is formed by putting an electrode slurry including an active material, a polymer binder, and a solvent into an extruder, by extrusion-coating the electrode slurry on the current collector while continuously providing the current collector to the extruder, and by drying the current collector coated with the electrode slurry to form an active material layer.

20 Claims, 6 Drawing Sheets

Related U.S. Application Data continuation of application No. PCT/KR2011/000288, filed on Jan. 14, 2011.

(51) Int. Cl.

| | |
|---|---|
| *H01M 4/04* | (2006.01) |
| *H01M 4/139* | (2010.01) |
| *H01M 4/62* | (2006.01) |
| *H01M 4/66* | (2006.01) |
| *H01M 10/04* | (2006.01) |
| *H01M 10/052* | (2010.01) |
| *H01M 10/0565* | (2010.01) |
| *H01M 10/058* | (2010.01) |
| *H01M 4/02* | (2006.01) |

(52) U.S. Cl.
CPC ........... *H01M 4/139* (2013.01); *H01M 4/621* (2013.01); *H01M 4/622* (2013.01); *H01M 4/623* (2013.01); *H01M 4/667* (2013.01); *H01M 4/668* (2013.01); *H01M 4/765* (2013.01); *H01M 10/0413* (2013.01); *H01M 10/0436* (2013.01); *H01M 10/052* (2013.01); *H01M 10/058* (2013.01); *H01M 10/0565* (2013.01); *H01M 2004/025* (2013.01); *Y02E 60/122* (2013.01); *Y02P 70/54* (2015.11); *Y02T 10/7011* (2013.01); *Y10T 29/49115* (2015.01)

(58) Field of Classification Search
CPC .... H01M 4/621; H01M 4/139; H01M 4/0411; H01M 4/0404; H01M 4/765; H01B 13/14
See application file for complete search history.

(56) References Cited

U.S. PATENT DOCUMENTS

| | | | |
|---|---|---|---|
| 5,001,023 A | * | 3/1991 | Cheshire ............... C08G 65/14 |
| | | | 29/623.5 |
| 5,492,782 A | | 2/1996 | Higley |
| 5,928,808 A | | 7/1999 | Eshraghi |
| 2003/0068559 A1 | | 4/2003 | Armstrong et al. |
| 2004/0159964 A1 | | 8/2004 | Lavoie et al. |
| 2006/0032045 A1 | * | 2/2006 | Naarmann ......... H01M 4/0404 |
| | | | 29/623.3 |
| 2007/0026312 A1 | | 2/2007 | Imachi et al. |
| 2011/0274954 A1 | | 11/2011 | Cho et al. |

FOREIGN PATENT DOCUMENTS

| | | | | |
|---|---|---|---|---|
| JP | H08-264203 A | | 10/1996 | |
| JP | 09-007629 A | | 1/1997 | |
| JP | 2001-110445 A | | 4/2001 | |
| JP | 2007-533098 A | | 11/2007 | |
| KR | WO 2005098994 A1 | * | 10/2005 | .......... H01G 2/0267 |
| KR | 20060012580 A | | 2/2006 | |
| KR | 20070009231 A | * | 1/2007 | |
| KR | 20070075928 A | | 7/2007 | |
| KR | 20090009598 A | | 1/2009 | |
| WO | 97/44847 A1 | | 11/1997 | |
| WO | 2004/051769 A2 | | 6/2004 | |
| WO | 2005098994 A1 | | 10/2005 | |
| WO | 2009014299 A1 | | 1/2009 | |

* cited by examiner

METHOD FOR MANUFACTURING CABLE-TYPE SECONDARY BATTERY

CROSS-REFERENCE TO RELATED APPLICATIONS

This application is a continuation of U.S. application Ser. No. 13/237,299, filed Sep. 20, 2011, which is a continuation of International Application No. PCT/KR2011/000288 filed on Jan. 14, 2011, published in Korean, which claims priority from Korean Patent Application No. 10-2010-0009438 filed on Feb. 2, 2010, and Korean Patent Application No. 10-2011-0003202 filed on Jan. 12, 2011, the entire contents of which are incorporated herein by reference.

TECHNICAL FIELD

The present invention relates to a method for manufacturing a cable-type secondary battery of free shape adaptation, and more particularly, to a method for manufacturing a cable-type secondary battery using an extruder.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

The secondary batteries are currently used in applications requiring low electric power, for example, equipment to help the start-up of vehicles, portable devices, tools, uninterruptible power supplies, and the like. Recently, as the development of wireless communication technologies has been leading to the popularization of portable devices and even to the mobilization of many kinds of conventional devices, the demand for the secondary batteries is dramatically increasing. The secondary batteries are also used in environmentally friendly next-generation vehicles such as hybrid vehicles and electric vehicles to reduce the costs and weight and to increase the service life of the vehicles.

Generally, the secondary batteries have a cylindrical, prismatic, or pouch shape. This is associated with a manufacturing process of the secondary batteries in which an electrode assembly composed of an anode, a cathode, and a separator is mounted in a cylindrical or prismatic metal case or a pouch-shaped case of an aluminum laminate sheet, and in which the case is filled with electrolyte. Because a predetermined mounting space for the electrode assembly is necessary in this process, the cylindrical, prismatic or pouch shape of the secondary batteries is a limitation in developing various shapes of portable devices.

To fulfill this need, suggestions have been made to develop linear batteries having a very large ratio of length to cross-sectional diameter. Korean Patent Registration No. 0804411 discloses a method for manufacturing a linear battery including a plurality of anodes and a plurality of cathodes with separators interposed therebetween. Korean Patent Registration No. 0742739 discloses a thread-type flexible battery including cathode threads and anode threads in which hot dipping, sputtering, chemical vapor deposition, and the like is used as a coating technique for electrodes and electrolyte. However, conventional non-continuous coating techniques are not suitable for cable-type secondary batteries having a linear structure extending longitudinally. There is a need for continuous coating suitable for cable-type secondary batteries.

SUMMARY OF THE INVENTION

It is an aspect of the present invention to provide continuous coating suitable for cable-type secondary batteries having a linear structure extending longitudinally.

In an embodiment of the present invention, provide is a method for manufacturing a cable-type secondary battery having an electrode that extends longitudinally in a parallel arrangement and that includes a current collector having a horizontal cross section of a predetermined shape and an active material layer formed on the current collector, the method comprising forming the electrode, in which the forming of the electrode includes putting an electrode slurry including an active material, a polymer binder, and a solvent into an extruder; extrusion-coating the electrode slurry on the current collector while continuously providing the current collector to the extruder; and drying the current collector coated with the electrode slurry to form an active material layer.

Preferably, the current collector may be made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers. The conductive material may be any one selected from the group consisting of polyacetylene, polyaniline, polypyrrole, polythiophene, polysulfur nitride, indium thin oxide (ITO), silver, palladium, nickel, and copper, or mixtures thereof. The conductive polymer may be any one selected from the group consisting of polyacetylene, polyaniline, polypyrrole, polythiophene, and polysulfur nitride, or mixtures thereof.

The active material may be an anode active material that may be any one selected from the group consisting of carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof, or may be a cathode active material that may be any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (each of M1 and M2 is independently any one selected from the group consisting of Al, Ni, Co, Fe, Mn, V, Cr, Ti, W, Ta, Mg, and Mo, and each of x, y, and z is independently an atomic fraction of each component in the oxide, where $0 \le x < 0.5$, $0 \le y < 0.5$, $0 \le z < 0.5$, $x+y+z \le 1$), or mixtures.

The polymer binder may be any one binder polymer selected from the group consisting of polyvinylidene fluoride (PVdF)-co-hexafluoropropylene, polyvinylidene fluoride-co-trichloroethylene, polymethylmethacrylate (PMMA), polybutylacrylate, polyacrylonitrile (PAN), polyvinylpyrrolidone, polyvinylacetate (PVAc), polyethylene-co-vinyl acetate, polyethylene oxide (PEO), polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose, or mixtures thereof.

The method for manufacturing a cable-type secondary battery of the present invention may further include putting a solid electrolyte material into the extruder, and extrusion-coating the solid electrolyte material on the electrode while continuously providing the electrode to the extruder, to form an electrolyte layer around the electrode.

The solid electrolyte material may include an electrolyte selected from the group consisting of a gel polymer electrolyte of PEO, PVdF, PMMA, PAN, or PVAc, and a solid polymer electrolyte of PEO, polyphenylene oxide (PPO), polyetherimide (PEI), polyethersulfone (PES), or PVAc.

The solid electrolyte material may further include a lithium salt, and the lithium salt may be any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and 4-phenyl lithium borate, or mixtures thereof.

According to another aspect of the present invention, a method for manufacturing a cable-type secondary battery may include forming an anode by extrusion-coating an electrode slurry on a current collector, the anode having a horizontal cross section of a predetermined shape and extending longitudinally; forming an electrolyte layer around the perimeter of an inner electrode by extrusion-coating a solid electrolyte material, the inner electrode including at least two anodes arranged in parallel; forming an outer electrode around the electrolyte layer, the outer electrode being a tubular cathode having a horizontal cross section of a predetermined shape; and forming a protection coating around the outer electrode.

According to still another aspect of the present invention, a method for manufacturing a cable-type secondary battery may include forming an anode having an electrolyte layer thereon by sequentially extrusion-coating an electrode slurry and a solid electrolyte material on a current collector, the anode having a horizontal cross section of a predetermined shape and extending longitudinally; forming an outer electrode having a cathode active material layer, the cathode active material layer surrounding the perimeter of the inner electrode including at least two anodes arranged in parallel; and forming a protection coating around the outer electrode.

According to still yet another aspect of the present invention, a method for manufacturing a cable-type secondary battery may include forming an anode having a first electrolyte layer thereon by sequentially extrusion-coating an electrode slurry and a solid electrolyte material on a current collector, the anode having a horizontal cross section of a predetermined shape and extending longitudinally; forming a cathode by extrusion-coating an electrode slurry on a current collector; forming a second electrolyte layer around the perimeter of an inner electrode by extrusion-coating a solid electrolyte material, the inner electrode including the anode and the cathode arranged in parallel; and forming a protection coating around the second electrolyte layer.

According to a method for manufacturing a cable-type secondary battery of the present invention, extrusion coating using an extruder effects continuous coating, and thus is suitable for manufacturing cable-type secondary batteries extending longitudinally. Also, the thickness of a coating layer is easily controlled by adjusting a linear velocity of a current collector or an extrusion rate of an extruder.

DESCRIPTION OF DRAWINGS

Other objects and aspects of the present invention will become apparent from the following description of embodiments with reference to the accompanying drawing in which.

DETAILED DESCRIPTION

Hereinafter, the present invention will be described in detail with reference to the accompanying drawings. The description proposed herein is just a preferable example for the purpose of illustrations only, not intended to limit the scope of the invention, so it should be understood that other equivalents and modifications could be made thereto without departing from the spirit and scope of the invention.

A cable-type secondary battery of the present invention has a horizontal cross section of a predetermined shape and a linear structure extending longitudinally. The cable-type secondary battery comprises an electrode extending longitudinally in a parallel arrangement and the electrode includes a current collector having a horizontal cross section of a predetermined shape and an active material coated on the current collector. Here, the predetermined shape is not limited to a specific shape, and may include any shape without departing from the spirit and scope of the present invention. Specifically, the horizontal cross section may have a circular or polygonal shape, wherein the circular shape may be a circular shape of geometrical symmetry or an oval shape of geometrical asymmetry, and the polygonal shape may be a triangular, square, pentagonal, or hexagonal shape. The cable-type secondary battery has flexibility and free shape adaptation, and thus may be applied to various shapes of portable devices. A method for manufacturing the cable-type secondary battery comprises forming an electrode by extrusion-coating an electrode slurry on a current collector, the electrode slurry including an active material, a polymer binder, and a solvent.

Figure 1:
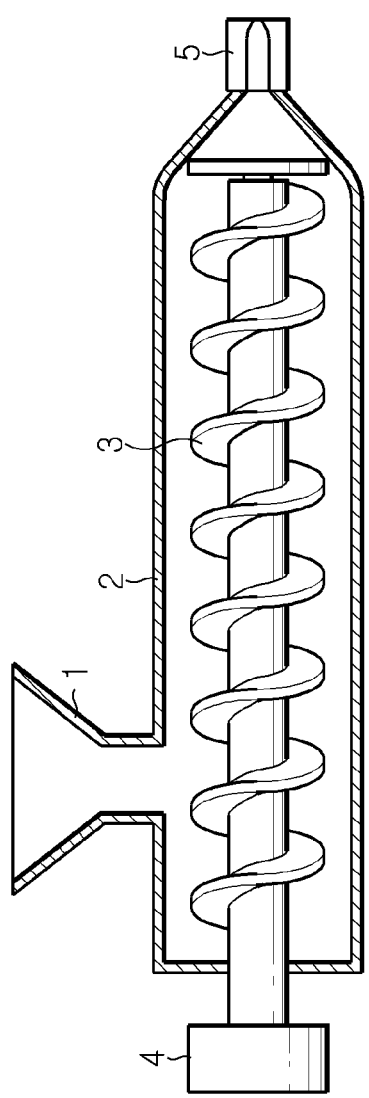
FIG. 1 is a schematic view of an extruder.

The extrusion coating is performed by coating and extruding a coating solution on the surface of a substrate through an extruder in a continuous way, and is less subject to limitation on the length of the substrate and enables continuous coating. Referring to FIG. 1, generally an extruder has a hopper 1, a cylinder 2, and a die 5. Typically, according to extrusion coating, a coating raw material is put into the hopper 1 and is transmitted toward the die 5 by the rotation of a screw 3 in the cylinder 2 while the coating raw material is molten into a coating solution as it goes through the cylinder 2 where a constant temperature is maintained, and the coating solution is coated on the substrate through the die 5 mounted at a front part of the cylinder 3. The cable-type secondary battery has shape characteristics of a linear structure extending longitudinally and a predetermined horizontal cross section, and thus is suitable for the application of continuous coating, in particular, extrusion coating.

Figure 2:
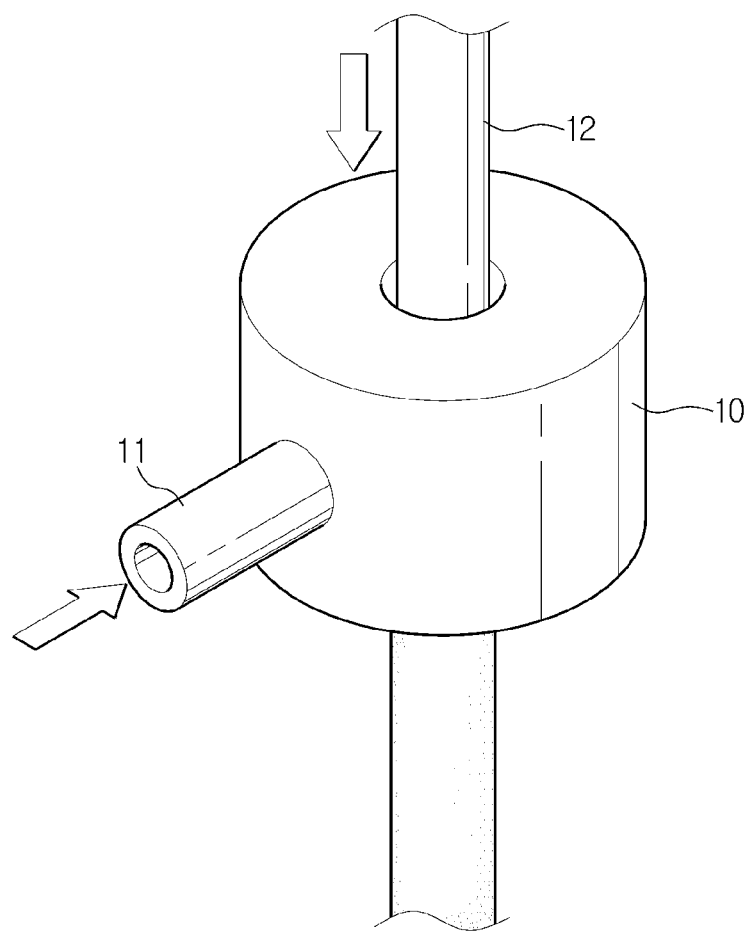
FIG. 2 is a view illustrating wire-type extrusion coating using an O-die.

The electrode extending longitudinally is formed by putting an electrode slurry into the hopper 1 of the extruder, by mixing and transmitting the electrode slurry to the die 5 by the rotation of the screw 3 in the cylinder 2, and by extrusion-coating the electrode slurry on a current collector through the die 5 mounted at a front part of the cylinder 2 while the current collector is provided to the extruder. The current collector for forming an electrode may be a wire-type current collector. The present invention is not limited to a specific type of die based on the type of the current collector. However, in the case of a wire-type current collector, an electrode slurry may be coated on the surface of a current collector while the current collector goes through a tubular O-die (See FIG. 2). The electrode slurry put into the extruder is provided through a coating material providing unit 11, is discharged through an O-die 10, and is extrusion-coated on a wire-type current collector 12 inserted into the O-die 10. In this instance, the thickness of a coating layer may be easily controlled by adjusting the density or an extrusion rate of the electrode slurry, or a linear velocity of the current collector that represents a supply rate of the current collector to the extruder.

Preferably, the current collector may be made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers. The conductive material may include polyacetylene, polyaniline, polypyrrole, polythiophene, polysulfur nitride, indium thin oxide (ITO), silver, palladium, nickel, and copper. The conductive polymer may include polyacetylene, polyaniline, polypyrrole, polythiophene, and polysulfur nitride.

The electrode slurry may include an active material, a polymer binder, and an organic solvent uniformly mixed therein, and may further include a conductive material. In this instance, the electrode slurry having its components uniformly mixed therein may be put into the extruder. Alternatively, the active material, the polymer binder, and the like may each be put into the extruder and then mixed with each other in the extruder. Preferably, drying may follow extrusion coating to remove the solvent.

The active material includes an anode active material and a cathode active material. The anode active material may include, but is not limited to, carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon. The cathode active material may include, but is not limited to, $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (each of M1 and M2 is independently any one selected from the group consisting of Al, Ni, Co, Fe, Mn, V, Cr, Ti, W, Ta, Mg, and Mo, and each of x, y, and z is independently an atomic fraction of each component in the oxide, where $0 \leq x < 0.5$, $0 \leq y < 0.5$, $0 \leq z < 0.5$, $x+y+z \leq 1$).

The polymer binder aids to bind the active material to the current collector, and may include polyvinylidene fluoride (PVdF)-co-hexafluoropropylene, polyvinylidene fluoride-co-trichloroethylene, polymethylmethacrylate (PMMA), polybutylacrylate, polyacrylonitrile (PAN), polyvinylpyrrolidone, polyvinylacetate (PVAc), polyethylene-co-vinyl acetate, polyethylene oxide (PEO), polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose.

The conductive material that may be further included in the electrode slurry is used to further improve conductivity of the active material, and the present invention is not limited to a specific type of conductive material if the conductive material has conductive properties and does not bring about a chemical change in the battery. For example, the conductive material may include graphite, carbon black, conductive fibers such as carbon fibers or metal fibers, fluorocarbons, metal powder such as aluminum powder or nickel powder, conductive whisker such as zinc oxide, potassium titanate, conductive metal oxides such as titanium oxide, and conductive materials such as polyphenylene derivatives. The present invention is not limited to a specific type of organic solvent, however N-methyl-2-pyrrolidone (NMP) is commonly used.

Hereinafter, the structure of a secondary battery that may be manufactured by a method for manufacturing a cable-type secondary battery according to the present invention is described with reference to FIG. 3, wherein like elements are referred to like reference numerals.

Figure 3:
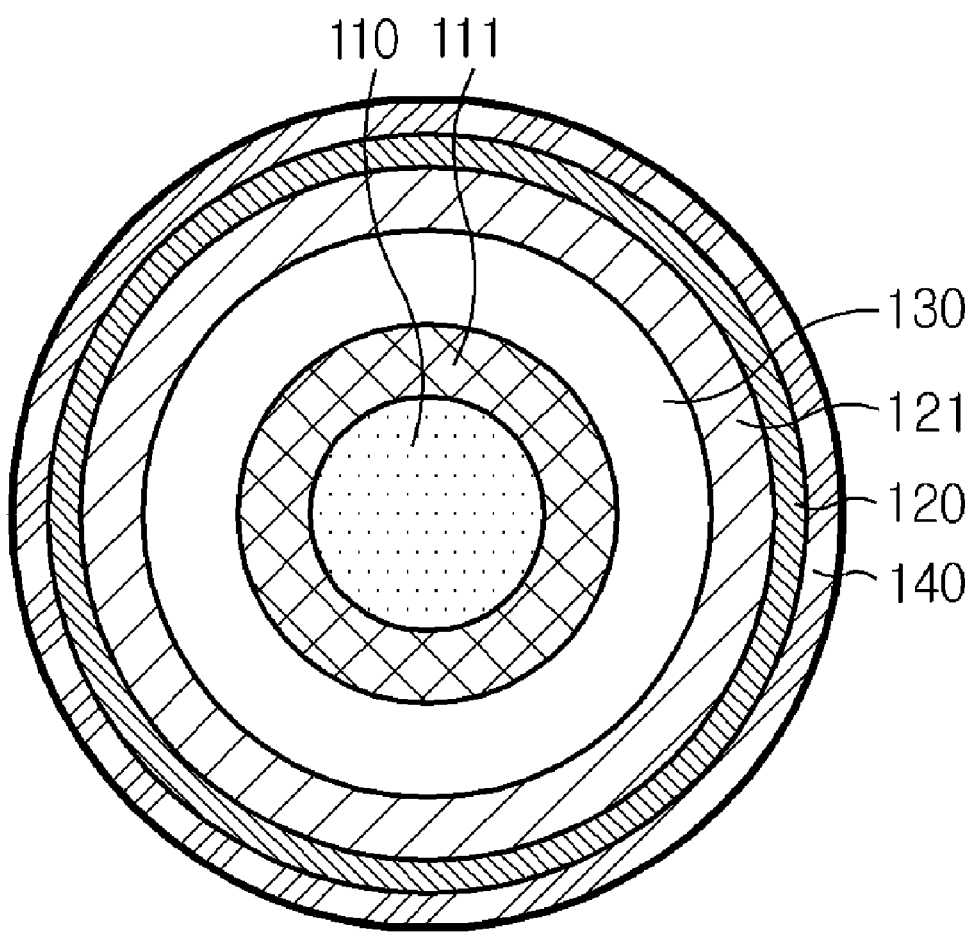
FIG. 3 is a cross-sectional view illustrating a cable-type secondary battery having an electrolyte layer interposed between an inner electrode and an outer electrode according to an embodiment of the present invention.

Referring to FIG. 3, a cable-type secondary battery according to an embodiment of the present invention comprises an inner electrode, an electrolyte layer 130, an outer electrode, and a protection coating 140. The inner electrode comprises an anode extending longitudinally in a parallel arrangement, and the anode includes a current collector 110 a horizontal cross section of a predetermined shape and an anode active material 111 coated on the current collector 110. The electrolyte layer 130 surrounds the inner electrode and serves as an ion channel. The outer electrode surrounds the electrolyte layer 130, and comprises a cathode including a tubular current collector 120 having a horizontal cross section of a predetermined shape and a cathode active material 121 coated on the inside of the current collector 120. The protection coating 140 surrounds the outer electrode. The anode 110 and 111 or the cathode 120 and 121 of the cable-type secondary battery is formed by coating an active material on a current collector, preferably by extrusion-coating an electrode slurry including an active material on a current collector through an extruder. After the inner electrode, that is, the anode 110 and 111 is formed, the electrolyte layer 130 may be formed around the inner electrode. Alternatively, after the electrolyte layer 130 is formed, the inner electrode may be inserted into the electrolyte layer 130. After the inner electrode and the electrolyte layer 130 are formed, the outer electrode and the protection coating 140 may be formed on the inner electrode and the electrolyte layer 130. Alternatively, after the electrolyte layer 130, the outer electrode, and the protection coating 140 are formed, the inner electrode may be inserted into the electrolyte layer 130, or after the outer electrode and the protection coating 140 are formed, the inner electrode may be inserted and the electrolyte layer 130 may be then formed.

Figure 4:
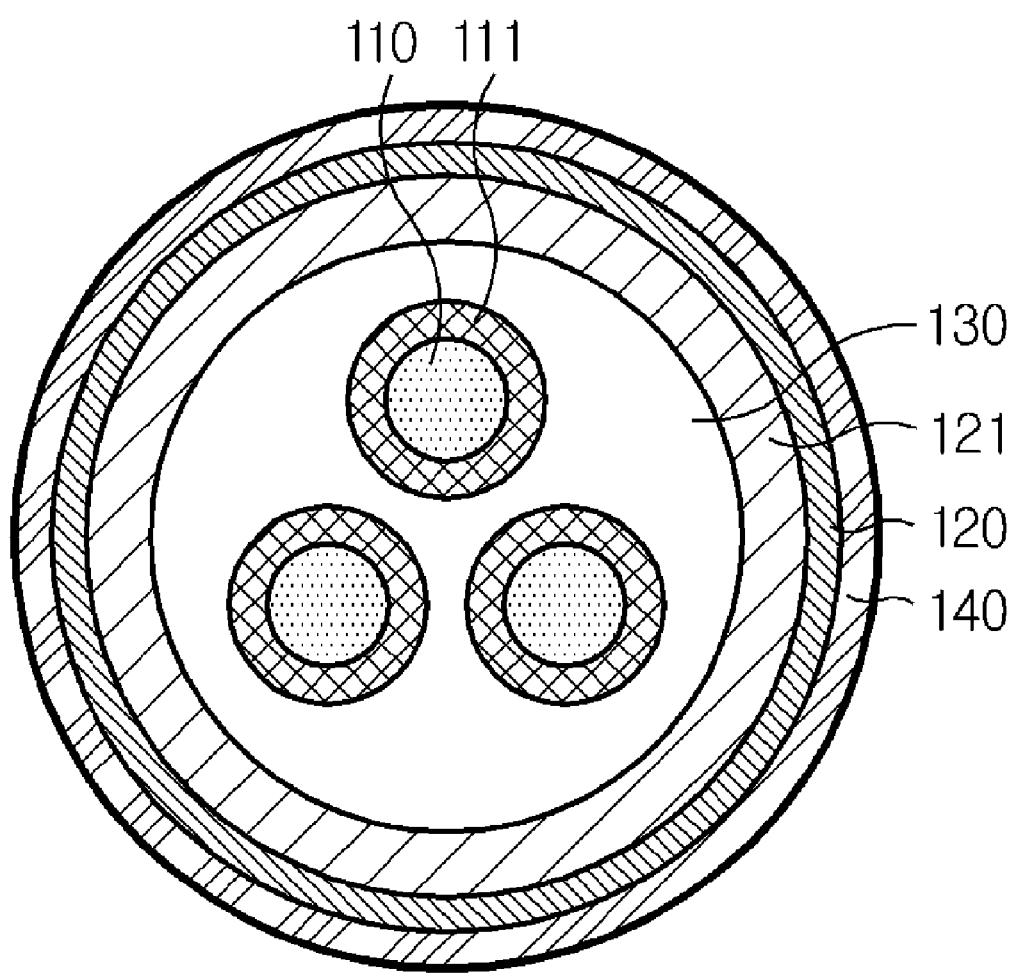
FIG. 4 is a cross-sectional view illustrating a cable-type secondary battery having an electrolyte layer interposed between an inner electrode and an outer electrode according to another embodiment of the present invention.
Figure 5:
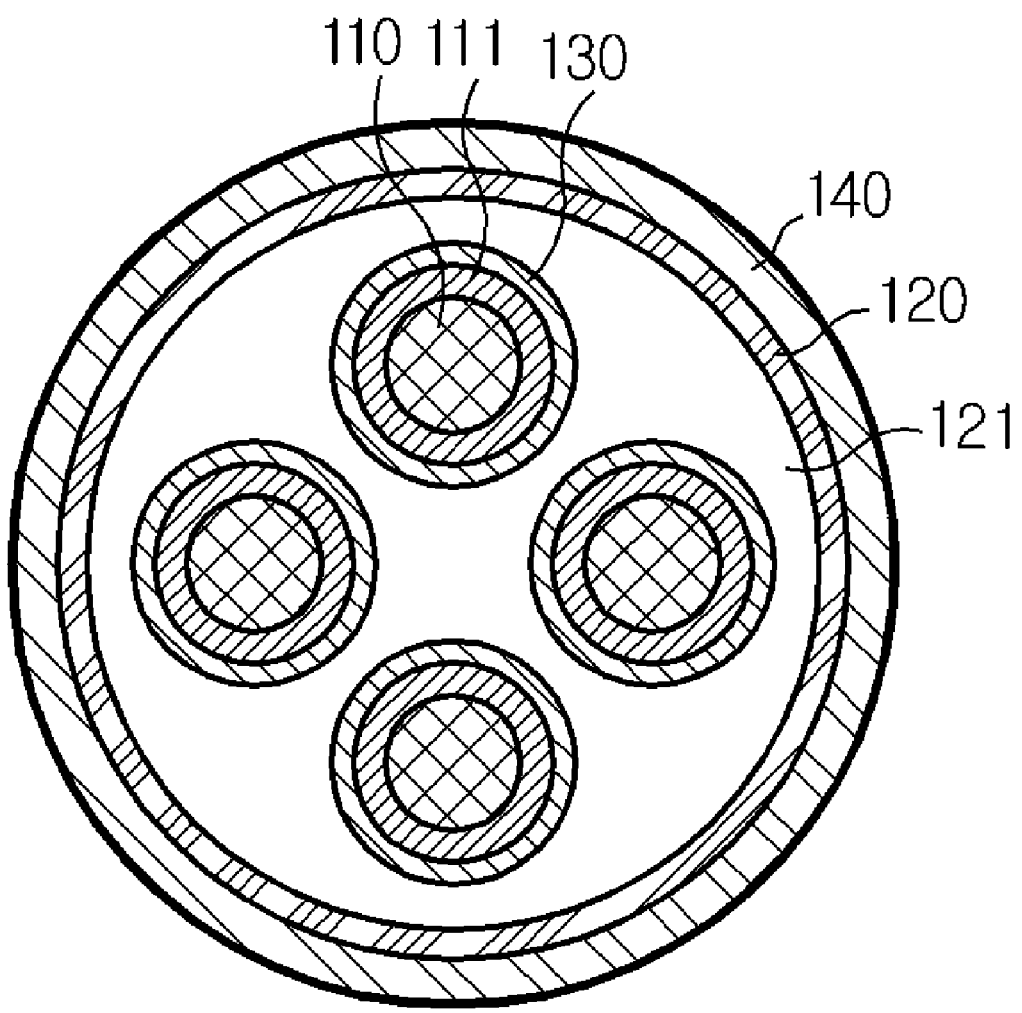
FIG. 5 is a cross-sectional view illustrating a cable-type secondary battery having an electrolyte layer around an inner electrode according to still another embodiment of the present invention.
Figure 6:
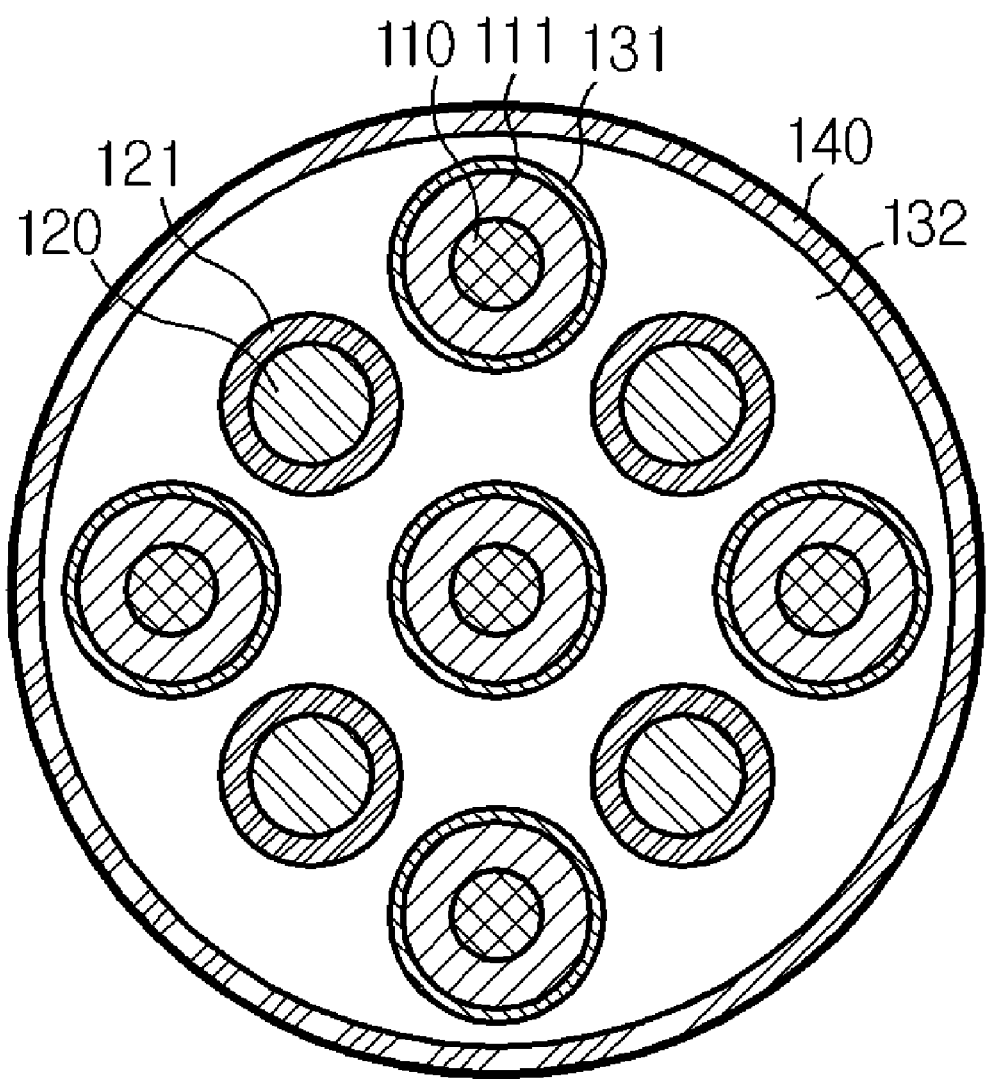
FIG. 6 is a cross-sectional view illustrating a cable-type secondary battery having a first electrolyte layer and a second electrolyte layer according to still yet another embodiment of the present invention.

In addition to the cable-type secondary battery of FIG. 3, modified cable-type secondary batteries of FIGS. 4 to 6 may be manufactured.

Referring to FIG. 4, a cable-type secondary battery according to another embodiment of the present invention comprises an inner electrode, an electrolyte layer 130, an outer electrode, and a protection coating 140. The inner electrode comprises at least two anodes extending longitudinally in a parallel arrangement, each including a current collector 110 having a horizontal cross section of a predetermined shape and an anode active material 111 coated on the current collector 110. The electrolyte layer 130 surrounds the perimeter of the inner electrode and serves as an ion channel. The outer electrode surrounds the electrolyte layer 130, and comprises a cathode including a tubular current collector 120 having a horizontal cross section of a predetermined shape and a cathode active material 121 coated on the inside of the current collector 120. The protection coating 140 surrounds the outer electrode. As the cable-type secondary battery of this embodiment includes a plurality of inner electrodes and a tubular outer electrode, the cable-type secondary battery has an increased contact area between the electrodes and the electrolyte and consequently a high rate. The capacity balance between the inner electrode and the outer electrode may be easily achieved by adjusting the number of the inner electrodes. The anode 110 and 111 or the cathode 120 and 121 of the cable-type secondary battery is formed by coating an active material on a current collector, preferably by extrusion-coating an electrode slurry including an active material on a current collector through an extruder. After the inner electrode, that is, the anode 110 and 111, is formed, the electrolyte layer 130 may be formed around the perimeter of the inner electrode. Alternatively, after the electrolyte layer 130 is formed, the inner electrode may be inserted into the electrolyte layer 130. After the inner electrode and the electrolyte layer 130 are formed, the outer electrode and the protection coating 140 may be formed on the inner electrode and the electrolyte layer 130. Alternatively, after the electrolyte layer 130, the outer electrode, and the protection coating 140 are formed, the inner electrode may be inserted into the electrolyte layer 130, or after the outer electrode and the protection coating 140 are formed, the inner electrode may be inserted and the electrolyte layer 130 may be then formed.

Referring to FIG. 5, a cable-type secondary battery according to still another embodiment of the present invention comprises an inner electrode, an outer electrode, and a protection coating 140. The inner electrode comprises at least two anodes extending longitudinally in a parallel arrangement, each including a current collector 110 having a horizontal cross section of a predetermined shape and an anode active material 111 coated on the current collector 110, and an electrolyte layer 130 is formed on the inner electrode and serves as an ion channel. The outer electrode comprises a cathode including a tubular current collector 120 and a cathode active material 121 surrounding the perimeter of the inner electrode. The protection coating 140 surrounds the outer electrode. As the cable-type secondary battery of this embodiment includes a plurality of inner electrodes and a tubular outer electrode, the cable-type secondary battery has an increased contact area between the electrodes and the electrolyte and consequently a high rate. The capacity balance between the inner electrode and the outer electrode may be easily achieved by adjusting the number of the inner electrodes. Also, a short circuit may be prevented because the electrolyte layer 130 is formed on the inner electrode. The anode 110 and 111 or the cathode 120 and 121 of the cable-type secondary battery is formed as an inner electrode by extrusion-coating an electrode slurry including an active material on a current collector through an extruder. The electrolyte layer 130 may be then formed on the inner electrode by coating. The active material 121 of the outer electrode may be coated around the perimeter of the inner electrode having the electrolyte layer 130. Alternatively, the inner electrode may be inserted into the active material 121. After the inner electrode and the active material 121 of the outer electrode are formed, the current collector 120 of the outer electrode and the protection coating 140 may be formed around the inner electrode and the active material 121. Alternatively, after the active material 121 and the current collector 120 of the outer electrode and the protection coating 140 are formed, the inner electrode may be inserted into the active material 121, or after the current collector 120 of the outer electrode and the protection coating 140 are formed, the inner electrode may be inserted and the active material 121 may be then formed.

Referring to FIG. 6, a cable-type secondary battery according to still yet another embodiment of the present invention comprises at least one anode, at least one cathode, a second electrolyte layer 132, and a protection coating 140. The anode includes a current collector 110 having a horizontal cross section of a predetermined shape and an anode active material 111 coated on the current collector 110, and a first electrolyte layer 131 is formed around the anode and serves as an ion channel. The cathode comprises a current collector 120 having a horizontal cross section of a predetermined shape and a cathode active material layer 121 coated on the current collector 120. The anode and the cathode extend longitudinally and are arranged in parallel. The second electrolyte layer 132 commonly surrounds the anode and the cathode, and serves as an ion channel. The protection coating 140 surrounds the second electrolyte layer 132. An electrolyte layer may be further formed around the cathode 120 and 121 to prevent a short circuit. As the cable-type secondary battery of this embodiment includes a plurality of anodes and a plurality of cathodes, the cable-type secondary battery has an increased contact area between the electrodes and the electrolyte and consequently a high rate. The capacity balance between the anode and the cathode may be easily achieved by adjusting the number of the anodes or the number of the cathodes. The anode 110 and 111 or the cathode 120 and 121 of the cable-type secondary battery is formed by extrusion-coating an electrode slurry including an active material on a current collector through an extruder. The first electrolyte layer 131 may be formed on the anode or the cathode by coating and the second electrolyte layer 132 may be then simultaneously formed around the anode and the cathode. Alternatively, after the second electrolyte layer 132 is formed, the anode and the cathode having the first electrolyte layer 131 may be inserted into the second electrolyte layer 132. Then, the protection coating 140 may be formed around the second electrolyte layer 132. Alternatively, after the second electrolyte layer 132 and the protection coating 140 are formed, the anode and the cathode may be inserted into the second electrolyte layer 132.

In a method for manufacturing the cable-type secondary battery as described above, it is preferred to form an electrolyte layer by extrusion coating. That is, the method for manufacturing the cable-type secondary battery of the present invention may further comprise putting a solid electrolyte material into the extruder, and coating the solid electrolyte material discharged from the extruder on the surface of the electrode to form an electrolyte layer which serves as an ion channel. The solid electrolyte material may include a solid electrolyte material that can be molten at a high temperature, and a solid electrolyte material in liquid state that is dissolved in a solvent.

When the electrolyte layer is formed on the anode or the cathode, the use of continuous coating, in particular, extrusion coating is preferred due to shape characteristics of the cable-type secondary battery that extends longitudinally. The solid electrolyte material is put into the hopper 1 of the extruder, is transmitted to the die 5 by the rotation of the screw 3 in the cylinder 2, and is coated on the surface of the electrode through the die 5 mounted at a front part of the cylinder 2, while the electrode is provided to the extruder. The present invention is not limited to a specific type of die for extrusion coating, however an O-die (See FIG. 2) is preferred due to shape characteristics of the electrode that extends longitudinally. In this instance, the thickness of a coating layer may be easily controlled by adjusting an extrusion rate of the solid electrolyte material or a linear velocity of the electrode that represents a supply rate of the electrode to the extruder. When a polymer electrolyte material requiring high temperature melting is used as the solid electrolyte material, it is preferred to heat the cylinder 2 of the extruder above the melting point and to maintain the temperature of the cylinder 2. However, when a solid electrolyte material in liquid state is used as the solid electrolyte material, drying may be further performed to remove the solvent.

The solid electrolyte material serving as an ion channel may include a gel polymer electrolyte of PEO, PVdF, PMMA, PAN, or PVAc; and a solid polymer electrolyte of PEO, polyphenylene oxide (PPO), polyetherimide (PEI), polyethersulfone (PES), or PVAc. Even though an polymer electrolyte has sufficient ion conductivity, ions may move slowly, that is, a reaction rate may be low, and so the gel polymer electrolyte having favorable ion movement is preferred over the solid electrolyte material. Because the gel polymer electrolyte has poor mechanical properties, a porous support or a crosslinked polymer may be used to improve the mechanical properties of the gel polymer electrolyte. The electrolyte layer of the present invention may act as a separator, thereby eliminating the use of a separator.

The electrolyte layer of the present invention may further contain a lithium salt. The lithium salt may be mixed with electrolyte when the electrolyte is provided to the extruder. The lithium salt may improve ion conductivity and a reaction rate, and may include, but is not limited to, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and 4-phenyl lithium borate, singularly or in combination.

The electrolyte layer 130 of FIGS. 3 to 5 and the first and second electrolyte layers 131 and 132 of FIG. 6 may be formed around a single electrode or a plurality of electrodes by coating the solid electrolyte material through the extruder. In this instance, when the electrolyte layer surrounds a plurality of electrodes, a modified type of die having a plurality of openings may be used to fix the electrodes respectively.

Also, the cable-type secondary battery of the present invention has the protection coating on the outmost surface thereof, and accordingly, the method for manufacturing a cable-type secondary battery of the present invention may further comprise coating the cable-type secondary battery with a polymer resin discharged from the extruder to form a protection coating on the outmost surface of the cable-type secondary battery. The protection coating of the present invention that is formed on the outmost surface of the secondary battery may act as an insulator to protect the electrode from moisture in the air or from external impact. The protection coating may include typical polymer resins, for example, PVC, high-density polyethylene (HDPE), or epoxy resin.

When the protection coating is formed on the outmost surface of the cable-type secondary battery, the use of continuous coating, in particular, extrusion coating is preferred due to shape characteristics of the cable-type secondary battery that extends longitudinally. First, a polymer resin is put into the hopper 1 of the extruder and turns to a polymer resin melt or a polymer resin solution while the polymer resin goes through the cylinder 2 where a constant temperature is maintained, and the polymer resin melt or polymer resin solution is transmitted to the die 5 by the rotation of the screw 3 in the cylinder 2, and is coated on the outmost surface of the secondary battery through the die 5 mounted at a front part of the cylinder 2. When the polymer resin melt is used, the manufacturing method of the present invention may further comprise cooling. When the polymer resin solution is used, the manufacturing method of the present invention may further comprise drying. In this instance, the thickness of a coating layer may be easily controlled by adjusting an extrusion rate of the polymer resin or a linear velocity of the secondary battery. The protection coating of FIGS. 3 to 6 may be formed by putting a polymer resin into the extruder and by coating the polymer resin on the outmost surface of the secondary battery.

Hereinafter, the present invention is described in detail through examples. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLE

Example 1: Manufacture of a Cable-Type Secondary Battery Having a Plurality of Anodes Referring to FIG. 5, the cable-type secondary battery of example 1 comprises an anode extending longitudinally and including a current collector 110 of a circular cross section and an active material 111 coated on the current collector 110; an electrolyte layer 130 formed on the surface of the anode and serving an ion channel; a cathode surrounding the perimeter of four anodes having electrolyte layers 130 and including a tubular current collector 120 and an active material 121 coated on the inside of the tubular current collector 120; and a protection coating 140 surrounding the cathode.

To manufacture the cable-type secondary battery, first an anode active material slurry having a weight ratio of artificial graphite, PVdF, carbon black and NMP=60:16:4:20 was put into a hopper of an extruder. The temperature of a cylinder of the extruder was maintained at 70° C., and a rotation rate of a screw was maintained between 70 and 80 rpm. A current collector made of a polytetrafluoroethylene (PTFE) wire surface-treated with copper was provided to an O-die of the extruder at a rate of 3 m/min, and the anode active material slurry was extrusion-coated on the current collector. The result was dried. In this way, an anode was formed.

Next, as a solid electrolyte, PEO containing 25 weight % of LiTFSI was put into the hopper of the extruder. The temperature of the cylinder of the extruder was maintained at 50° C., and a rotation rate of the screw was maintained between 60 and 70 rpm. The solid electrolyte was extrusion-coated on the surface of the anode while the anode was provided to the O-die of the extruder at a rate of 3 m/min. Accordingly, the anode coated with electrolyte was produced.

Then, a cathode was formed by filling a cathode active material including LiCoO$_2$, PVdF, Denka black, and NMP into a tubular current collector of aluminum. The four anodes coated with electrolyte and the cathode were assembled into an electrode assembly.

Finally, PVC was put into the extruder. The temperature of the cylinder of the extruder was maintained at 250° C., and a rotation rate of the screw was maintained at 100 rpm. A protection coating was formed on the electrode assembly while the electrode assembly was provided to the O-die at a rate of 30 m/min. As described above, a cable-type secondary battery was completed.

What is claimed is:

1. A method for manufacturing a cable secondary battery comprising:
    forming an anode having an electrolyte layer thereon by sequentially extrusion-coating an electrode slurry and a solid electrolyte material on a current collector, the anode having a horizontal cross section of a predetermined shape and extending longitudinally;
    the forming the anode having the electrolyte layer thereon comprising:
        forming the anode by putting the electrode slurry including an anode active material, a polymer binder, and a solvent into an extruder having an O-die; extrusion-coating the electrode slurry put through a providing unit of the O-die on the current collector that goes through the O-die while continuously providing the current collector to the extruder having the O-die; and drying the current collector coated with the electrode slurry to form an active material layer; and
        forming the electrolyte layer around a perimeter of the anode by putting the solid electrolyte material into the extruder having the O-die, and extrusion-coating the solid electrolyte material on a surface of the anode that goes through the O-die while continuously providing the anode to the extruder having the O-die;
    forming an outer electrode having a cathode active material layer, the cathode active material layer surrounding a perimeter of a plurality of inner electrodes including at least two of the anodes having the electrolyte layer thereon arranged in parallel; and
    forming a protection coating around the outer electrode, wherein the solid electrolyte material includes an electrolyte selected from the group consisting of a gel polymer electrolyte of polyethylene oxide (PEO), polyvinylidene fluoride (PVDF), polymethylmethacrylate (PMMA), polyacrylonitrile (PAN), or polyvinylacetate (PVAc); and a solid polymer electrolyte of polyethylene oxide PEO, polyphnylene oxide (PPO), polyetherimide (PEI), polyethersulfone (PES), or polyvinylacetate (PVAc).

2. The method for manufacturing a cable secondary battery according to claim 1,
    wherein the current collector is made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers.

3. The method for manufacturing a cable secondary battery according to claim 2,
    wherein the conductive material is any one selected from the group consisting of polyacetylene, polyaniline, polypyrrole, polythiophene, polysulfur nitride, indium thin oxide (ITO), silver, palladium, nickel, and copper, or mixtures thereof.

4. The method for manufacturing a cable secondary battery according to claim 2,
    wherein the conductive polymer is any one selected from the group consisting of polyacetylene, polyaniline, polypyrrole, polythiophene, and polysulfur nitride, or mixtures thereof.

5. The method for manufacturing a cable secondary battery according to claim 1,
    wherein the anode active material is an active material particle of any one selected from the group consisting of carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

6. The method for manufacturing a cable secondary battery according to claim 1,
    wherein the cathode active material is an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (each of M1 and M2 is independently any one selected from the group consisting of Al, Ni, Co, Fe, Mn, V, Cr, Ti, W, Ta, Mg, and Mo, and each of x, y, and z is independently an atomic fraction of each component in the oxide, where $0 \leq x<0.5$, $0 \leq y<0.5$, $0 \leq z<0.5$, $x+y+z \leq 1$), or mixtures.

7. The method for manufacturing a cable secondary battery according to claim 1,
    wherein the polymer binder is any one binder polymer selected from the group consisting of polyvinylidene fluoride (PVdF)-co-hexafluoropropylene, polyvinylidene fluoride-co-trichloroethylene, polymethylmethacrylate (PMMA), polybutylacrylate, polyacrylonitrile (PAN), polyvinylpyrrolidone, polyvinylacetate (PVAc), polyethylene-co-vinyl acetate, polyethylene oxide (PEO), polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and mixtures thereof.

8. The method for manufacturing a cable secondary battery according to claim 1,
    wherein the solid electrolyte material further includes a lithium salt.

9. The method for manufacturing a cable secondary battery according to claim 8,
    wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and 4-phenyl lithium borate, or mixtures thereof.

10. The method for manufacturing a cable secondary battery according to claim 1,
    wherein the step of extrusion-coating the electrode slurry includes passing the electrode slurry through a lumen defined by the providing unit along a first direction, and passing the current collector through the O-die along a second direction that is substantially perpendicular to the first direction.

11. A method for manufacturing a cable secondary battery comprising:
    forming an anode having a first electrolyte layer thereon by sequentially extrusion-coating an electrode slurry and a solid electrolyte material on a current collector, the anode having a horizontal cross section of a predetermined shape and extending longitudinally;

the forming the anode having the first electrolyte layer thereon comprising:

forming the anode by putting the electrode slurry including an anode active material, a polymer binder, and a solvent into an extruder having an O-die; extrusion-coating the electrode slurry put through a providing unit of the O-die on the current collector that goes through the O-die while continuously providing the current collector to the extruder having the O-die; and drying the current collector coated with the electrode slurry to form an active material layer; and forming the first electrolyte layer around a perimeter of the anode by putting the solid electrolyte material into the extruder having the O-die, and extrusion-coating the solid electrolyte material on a surface of the anode that goes through the O-die while continuously providing the anode to the extruder having the O-die;

forming a cathode by putting an electrode slurry including a cathode active material, a polymer binder, and a solvent into an extruder having an O-die; extrusion-coating the electrode slurry put through a providing unit of the O-die on a current collector that goes through the O-die while continuously providing the current collector to the extruder having the O-die; and drying the current collector coated with the electrode slurry to form an active material layer;

forming a second electrolyte layer around a perimeter of a plurality of inner electrodes by extrusion-coating a solid electrolyte material, the plurality of inner electrodes including at least two of the anodes and at least two of the cathodes arranged in parallel; and forming a protection coating around the second electrolyte layer, wherein the solid electrolyte material includes an electrolyte selected from the group consisting of a gel polymer electrolyte of polyethylene oxide (PEO), polyvinylidene fluoride (PVDF), polymethylmethacrylate (PMMA), polyacrylonitrile (PAN), or polyvinylacetate (PVAc); and a solid polymer electrolyte of polyethylene oxide PEO, polyphenylene oxide (PPO), polyetherimide (PEI), polyethersulfone (PES), or polyvinylacetate (PVAc).

12. The method for manufacturing a cable secondary battery according to claim 11, wherein the current collector is made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers.

13. The method for manufacturing a cable secondary battery according to claim 12, wherein the conductive material is any one selected from the group consisting of polyacetylene, polyaniline, polypyrrole, polythiophene, polysulfur nitride, indium thin oxide (ITO), silver, palladium, nickel, and copper, or mixtures thereof.

14. The method for manufacturing a cable secondary battery according to claim 12, wherein the conductive polymer is any one selected from the group consisting of polyacetylene, polyaniline, polypyrrole, polythiophene, and polysulfur nitride, or mixtures thereof.

15. The method for manufacturing a cable secondary battery according to claim 11, wherein the anode active material is an active material particle of any one selected from the group consisting of carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

16. The method for manufacturing a cable secondary battery according to claim 11, wherein the cathode active material is an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (each of M1 and M2 is independently any one selected from the group consisting of Al, Ni, Co, Fe, Mn, V, Cr, Ti, W, Ta, Mg, and Mo, and each of x, y, and z is independently an atomic fraction of each component in the oxide, where $0 \leq x < 0.5$, $0 \leq y < 0.5$, $0 \leq z < 0.5$, $x+y+z \leq 1$), or mixtures.

17. The method for manufacturing a cable secondary battery according to claim 11, wherein the polymer binder is any one binder polymer selected from the group consisting of polyvinylidene fluoride (PVdF)-co-hexafluoropropylene, polyvinylidene fluoride-co-trichloroethylene, polymethylmethacrylate (PMMA), polybutylacrylate, polyacrylonitrile (PAN), polyvinylpyrrolidone, polyvinylacetate (PVAc), polyethylene-co-vinyl acetate, polyethylene oxide (PEO), polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and mixtures thereof.

18. The method for manufacturing a cable secondary battery according to claim 11, wherein the solid electrolyte material further includes a lithium salt.

19. The method for manufacturing a cable secondary battery according to claim 18, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and 4-phenyl lithium borate, or mixtures thereof.

20. The method for manufacturing a cable secondary battery according to claim 11, wherein the step of extrusion-coating the electrode slurry during the step of forming the anode includes passing the electrode slurry through a lumen defined by the providing unit along a first direction, and passing the current collector through the O-die along a second direction that is substantially perpendicular to the first direction.

* * * * *